United States Patent
Vollhardt et al.

[11] Patent Number: 5,586,995
[45] Date of Patent: Dec. 24, 1996

[54] FILTER FOR SEPARATING POLLUTANTS FROM FLUE GASES

[75] Inventors: Frohmut Vollhardt, Oberhausen; Jürgen R. Heering, Korschenbroich, both of Germany

[73] Assignee: Man Gutehoffnungshutte Aktiengesellschaft, Oberhausen, Germany

[21] Appl. No.: 399,751

[22] Filed: Mar. 7, 1995

[30] Foreign Application Priority Data

Mar. 30, 1994 [DE] Germany ............ 44 11 078.2

[51] Int. Cl.⁶ ............................................. B01D 47/14
[52] U.S. Cl. ............................ 55/227; 55/229; 55/233; 261/98; 261/DIG. 9
[58] Field of Search ................. 55/233, 234, 227, 55/229; 95/210–212; 261/94–98, DIG. 9

[56] References Cited

U.S. PATENT DOCUMENTS

| | | | |
|---|---|---|---|
| 1,895,618 | 1/1933 | Fedeler | 55/233 X |
| 3,409,409 | 11/1968 | Sackett, Sr. | 55/233 X |
| 3,905,774 | 9/1975 | Kotting | 261/94 X |
| 3,960,507 | 6/1976 | Tsujikawa et al. | 261/DIG. 9 |
| 4,662,900 | 5/1987 | Ottengraf | 55/233 X |
| 4,722,745 | 2/1988 | Pike | 261/97 X |
| 4,948,402 | 8/1990 | Davis | 261/98 X |
| 5,209,766 | 5/1993 | Reither | 55/233 X |

FOREIGN PATENT DOCUMENTS

| | | | |
|---|---|---|---|
| 46824 | 3/1911 | Austria | 55/233 |
| 0490202 | 6/1992 | European Pat. Off. | 55/234 |
| 62-277121 | 12/1987 | Japan | 55/233 |
| 4-358513 | 12/1992 | Japan | 55/233 |

*Primary Examiner*—Richard L. Chiesa
*Attorney, Agent, or Firm*—McGlew and Tuttle, P.C.

[57] ABSTRACT

A filter for separating pollutants from flue gases with a filter housing and with a plurality of filter boxes arranged therein at spaced locations horizontally one on top of another or vertically next to one another. These filter boxes contain the filter medium, which may be activated carbon, open-hearth furnace coke or a similar material. The filter boxes are sprayed with water via nozzles. The sprayed surfaces of the filter boxes are correspondingly designed as surfaces permeable to water. Flue gases flow into the filter boxes from the bottom. These surfaces of the filter boxes are correspondingly permeable to gas. A water collection box with vertical gas flow pipes, from which the collected water is pumped off and reused for spraying with water, is located under the filter boxes.

12 Claims, 2 Drawing Sheets

1

FILTER FOR SEPARATING POLLUTANTS FROM FLUE GASES

FIELD OF THE INVENTION

The present invention pertains to a filter for separating pollutants from flue gases, with a filter housing, containing the filter medium activated carbon, open-hearth furnace coke or the like, with a means for the metered charging in of water, with a drain means for sludge saturated with pollutants, as well as with flue gas feed and flue gas exhaust pipe connections.

BACKGROUND OF THE INVENTION

An activated carbon filter for separating pollutants, e.g., dioxins and furans from flue gases before they enter the flue has been known from EP-B1-0,490,202. To absorb these pollutants, activated carbon is mixed with 30–40 vol. % of water in a filter vessel, and the flue gases are passed through the activated carbon-water mixture in the form of fine chains of bubbles. The filter vessel has a perforated partition as a gas distributor. The activated carbon sludge saturated with pollutants is drained off and replaced by correspondingly adding dry activated carbon and water.

The prior-art activated carbon filter has been tested in field tests, and it has met the requirements in terms of the filtration efficiency.

SUMMARY AND OBJECTS OF THE INVENTION

The primary object of the present invention is to improve the design and the technological process of filters using the filter medium activated carbon, open-hearth furnace coke or similar filtering agents for use within the framework of, e.g., waste incinerator plants such that the filter medium present in the filter vessel will be prevented from being completely immersed into a water bath during the filtration process.

According to the invention, a filter is provided for separating pollutants from flue gases. The filter comprises a filter housing containing a filter medium such as activated carbon, open hearth furnace coke or similar material. Water distribution means is provided for a metered charging of water. A drain means is provided for sludge saturated with pollutants. Flue gas feed and flue gas exhaust pipe connections are also provided. The filter medium is positioned within the filter by use of a plurality of filter boxes. Each of the filter boxes contain the filter medium and the boxes are arranged at spaced locations, horizontally one on top of another or vertically next to one another. Filter boxes are installed within the filter housing and the walls of the filter boxes have a cage-like design that is formed with a mesh structure which is permeable to gas and water. The flue gas feed connection is arranged at the bottom of the filter housing under the filter boxes. Nozzles of the water distribution means are positioned for spraying the filling in the filter boxes (spraying the filter medium). The nozzles are arranged at least above each filter box in the case of the horizontally arranged filter boxes, or on a side of the filter box, in the case of the vertically arranged filter boxes. A water collection tank is provided with vertical gas flue pipes extending therethrough. Pumping means is connected to the water collection tank for pumping off water collected in the water collection tank and feeding the water to nozzles of the water distribution means. The nozzles are positioned for spraying filter medium with water. The water collection tank is positioned under the lowest most filter box or, in the case of a vertical arrangement of the filter boxes, under the filter boxes. The flue gas exhaust pipe connection, for cleaned flue gas is arranged at the top of the filter housing.

The walls of the filter boxes are exposed to gas flow and to water spray and are designed as walls which are permeable to both gas and water. The water collection tank contains a water level gauge via which a pulse may be sent to a water intake valve in a water line for adding water to the water distribution means, when the water level drops below the set level. The filter boxes, either horizontally or vertically arranged, containing the filter medium, are positioned within the filter housing such that they can be lifted out of the filter housing when necessary. The filter housing itself may be cylindrical with either with square, polygonal or a circular cross section. If a plurality of filter housings are provided, they may be connected in parallel.

In designing the filter, it is possible to select installation of the filter boxes containing the filter medium in a horizontal arrangement or in a vertical arrangement.

At least the surfaces of the filter boxes to which the flue gas flows and which are sprayed with water are designed as grid-like surfaces, so that they are permeable to gas and water. The mesh of the grid surfaces must not, of course, be wide enough for the granular filter medium to be able to pass through the mesh.

The filter housing is designed such that easy removal of filter boxes is possible, e.g., for the purpose of replacing the filter medium. This can be done by pulling or lifting out the filter boxes like drawers.

The water leaving the individual filter boxes installed above a collection box is collected in the said collection box, which is arranged in the lowermost position and is open at its top; this water is again pumped in the upward direction, and is used again as spray water.

It is, of course, possible to assemble any desired number of individual filters into a filter unit, and the filter housing may have a square, polygonal or circular cross section.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
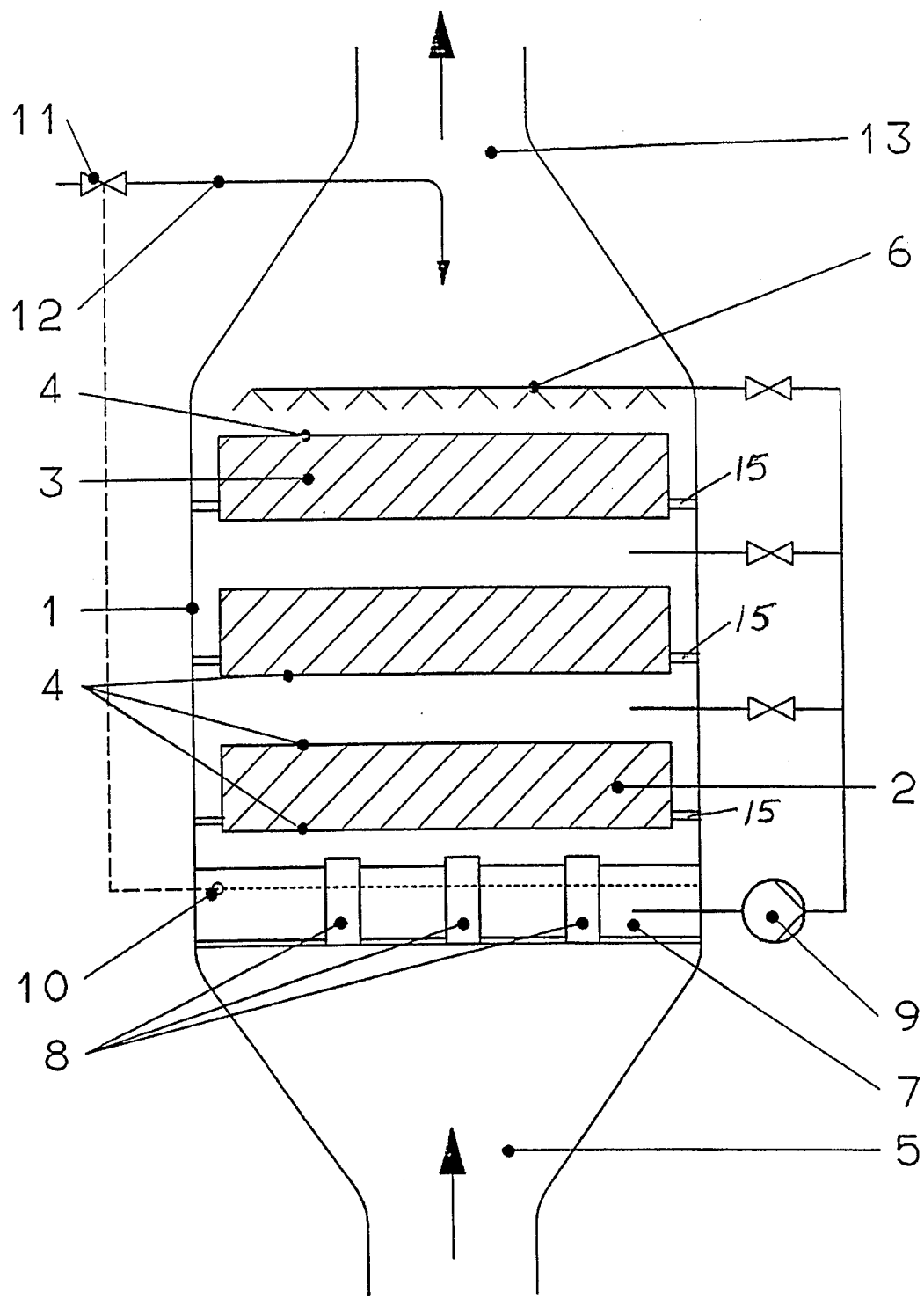
FIG. 1 is a schematic sectional view through a filter with horizontally arranged filter boxes and FIG. 2 is a schematic sectional view through a filter with vertically arranged filter boxes.

According to FIG. 1, the filter boxes 2 are arranged horizontally one above the other within the filter housing 1.

The walls 4 of the filter boxes 2 are designed as grid-like walls (to form a cage like structure) in the areas in which flue gases are to pass through or water is to be sprayed on.

The filter medium 3 is located in the filter boxes 2 in the form of granular activated carbon, open-hearth furnace coke or a similar medium.

Flue gas flows from the bottom into the filter housing 1 via the flue gas feed pipe connection 5.

Vertical gas flow pipes 8 are located in the water collection box 7 arranged under the filter boxes 2. The flue gas passes through the vertical gas flow pipes 8 and then reaches the superjacent filter boxes 2 filled with filter medium 3. The filter housing 1 preferably includes interior distribution elements and supports 15. These both help support the filter boxes 2 and direct the flue gas such that it must pass through the filter boxes 2 during its course through the filter housing. The supports can also be used to allow individual boxes 2 to be removed by pulling or lifting out the filter boxes 2 like drawers.

Spray nozzles 6 spray water onto the filter medium 3, which fills the filter boxes 2. The spray nozzles 6 are located above each filter box 2. Spray water running off is collected in the water collection tank 7 located at the bottom, and it is again delivered via pump 9 (pump means) to the nozzles 6 of the nozzle line. The pump means 9 is connected to the water collection tank 7 for pumping of water collected in the water collection tank 7 and for feeding the water to nozzles 6.

The water collection tank 7 has a water level gauge 10. As soon as the water level in the water collection tank 7 drops below a predetermined level, a valve 11 in the make-up water line 12 is opened by means of a pulse, so that additional water is fed to the filter.

A means (not shown) for removing settled sludge is arranged on the bottom of the water collection box or tank 7.

The cleaned flue gas is discharged via the exhaust pipe connection 13.

Figure 2:
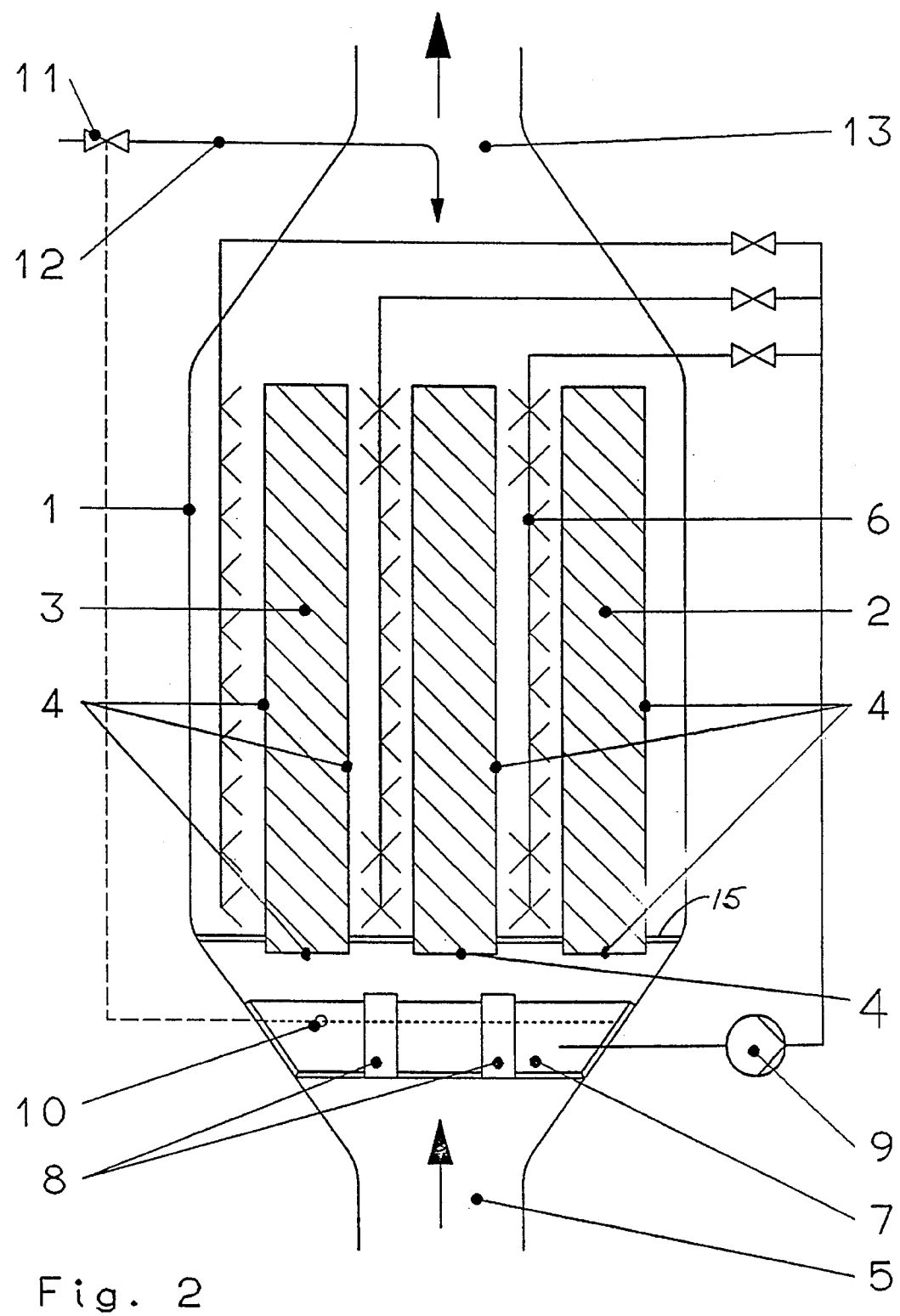

FIG. 2 shows a filter with a filter housing 1, in which the filter boxes 2 are arranged vertically. The spray nozzles 6 are correspondingly installed in vertical lines. Either only one surface of a filter box 2 can be sprayed, or both filter surfaces of a filter box 2 can also be sprayed in the case of a corresponding arrangement of the nozzle lines.

The rest of the design of the filter corresponds to that according to FIG. 1. Thus, there is, e.g., a water collection box 7 here as well, and the collected water is returned in the same manner as in the case of the filter according to FIG. 1.

While specific embodiments of the invention have been shown and described in detail to illustrate the application of the principles of the invention, it will be understood that the invention may be embodied otherwise without departing from such principles.

What is claimed is:

1. A flue gas filter for separating pollutants from the flue gases, comprising: a filter housing; a plurality of filter boxes, each filter box being arranged at a spaced location from another filter box and being disposed one of horizontally one on top of another or vertically one next to another, said filter boxes being positioned within said filter housing, said filter boxes including cage-wall means for defining walls which are permeable to gas and water; filter medium selected from the group consisting of activated carbon, open-hearth furnace coke and carbonaceous material, said cage wall means retaining said filter medium within said filter boxes; water distribution means for providing a metered charging of water into said housing, said water distribution means including nozzles for spraying said filter medium in said filter boxes, said nozzles being arranged one of above each filter box, for horizontally arranged filter boxes, and to a side of each filter box, for vertically arranged filter boxes; a water collection tank, positioned below said filter boxes, for collecting water; pump means connected to said collection tank for pumping collected water and feeding water to said nozzles of said distribution means; a flue gas feed pipe connection arranged at the bottom of said filter housing; vertical gas flow pipes extending through said water collection tank for passage of flue gases from said flue gas feed pipe, past said water collection tank; and a flue gas exhaust pipe arranged at a top of said filter housing.

2. A filter according to claim 1, wherein selected walls of said filter boxes, are exposed to gas flow and to water spray and include said cage wall means, permeable to gas and water.

3. A filter according to claim 1, further comprising a water level gauge positioned in said water collection tank; a water intake line connected to said water distribution means and a valve connected to said water intake line, said water level gauge being connected to said valve for generating an opening pulse to open said valve when a water level in said water collection tank drops below a set level.

4. A filter according to claim 1, wherein said vertically arranged filter boxes are supported within said filter housing for removal of said filter boxes from said filter housing, when necessary.

5. A filter according to claim 1, wherein said filter has a cross section which is one of square, polygonal or circular.

6. A filter according to claim 1, wherein a plurality of filter housings are connected in parallel.

7. A flue gas filter for separating pollutants from the flue gases, comprising: a filter housing; a plurality of filter boxes, each filter box being arranged at a spaced location from another filter box and being disposed one of horizontally one on top of another or vertically one next to another, said filter boxes being positioned within said filter housing, said filter boxes including cage-wall means for defining walls which are permeable to gas and water; filter medium comprising activated carbon, open-hearth furnace coke or carbonaceous material, said cage wall means retaining said filter medium within said filter boxes; water distribution means for providing a metered charging of water into said housing, said water distribution means including nozzles for spraying said filter medium in said filter boxes, said nozzles being arranged one of above each filter box, for horizontally arranged filter boxes, and to a side of each filter box, for vertically arranged filter boxes; a water collection tank, positioned below said filter boxes, for collecting water; pump means connected to said collection tank for pumping collected water and feeding water to said nozzles of said distribution means; a flue gas feed pipe connection arranged at the bottom of said filter housing; vertical gas flow pipes extending through said water collection tank for passage of flue gases from said flue gas feed pipe, past said water collection tank; and a flue gas exhaust pipe arranged at a top of said filter housing.

8. A filter according to claim 7, wherein selected walls of said filter boxes, are exposed to gas flow and to water spray and include said cage wall means, permeable to gas and water.

9. A filter according to claim 7, further comprising a water level gauge positioned in said water collection tank; a water intake line connected to said water distribution means and a valve connected to said water intake line, said water level gauge being connected to said valve for generating an opening pulse to open said valve when a water level in said water collection tank drops below a set level.

10. A filter according to claim 7, wherein said vertically arranged filter boxes are supported within said filter housing for removal of said filter boxes from said filter housing, when necessary.

11. A filter according to claim 7, wherein said filter has a cross section which is one of square, polygonal or circular.

12. A filter according to claim 7, wherein a plurality of filter housings are connected in parallel.

\* \* \* \* \*